(12) United States Patent
Ochiai

(10) Patent No.: US 6,425,837 B1
(45) Date of Patent: Jul. 30, 2002

(54) POWER TRANSMISSION

(75) Inventor: Yoshihiro Ochiai, Tomioka (JP)

(73) Assignee: Sanden Corporation, Gunma (JP)

( * ) Notice: Subject to any disclaimer, the term of this patent is extended or adjusted under 35 U.S.C. 154(b) by 40 days.

(21) Appl. No.: 09/703,617

(22) Filed: Nov. 2, 2000

(30) Foreign Application Priority Data

Mar. 13, 2000 (JP) ..................... P2000-068574

(51) Int. Cl.$^7$ .................. F16H 61/00; F16D 43/20; F16D 7/08
(52) U.S. Cl. ................ 474/70; 192/56.5; 464/36
(58) Field of Search ................ 474/93, 70, 199; 464/36; 192/56.5, 54.2, 56.1

(56) References Cited

U.S. PATENT DOCUMENTS

| | | | |
|---|---|---|---|
| 1,767,566 A | | 6/1930 | Updike |
| 1,941,061 A | | 12/1933 | Thiry |
| 2,356,842 A | | 8/1944 | Helmond |
| 2,493,232 A | * | 1/1950 | Dodge .................. 192/56.5 |
| 3,058,321 A | | 10/1962 | Aske |
| 3,654,777 A | | 4/1972 | Grundman |
| 3,718,009 A | | 2/1973 | Perina |
| 4,748,865 A | | 6/1988 | Umezawa et al. |
| 5,005,684 A | * | 4/1991 | Fujii .................. 192/56.57 |
| 5,377,962 A | | 1/1995 | Ochs et al. |
| 5,516,331 A | | 5/1996 | Morr et al. |
| 5,542,884 A | * | 8/1996 | Gotz .................. 464/36 |
| 5,564,981 A | | 10/1996 | Iwabuchi et al. |
| 5,700,196 A | * | 12/1997 | Banemann et al. ........ 464/36 |
| 5,704,839 A | | 1/1998 | Michael et al. |
| 5,857,913 A | * | 1/1999 | Fujimura et al. ........ 192/56.62 |
| 5,944,156 A | | 8/1999 | Hatakeyama |
| 6,012,563 A | * | 1/2000 | Aoki et al. ............ 192/84.95 |

FOREIGN PATENT DOCUMENTS

| | | | |
|---|---|---|---|
| GB | 751383 | | 2/1955 |
| JP | 5705046 A | * | 3/1982 |
| JP | 8135752 | | 5/1996 |
| JP | 9004564 | | 1/1997 |

* cited by examiner

*Primary Examiner*—Lenard A. Footland
*Assistant Examiner*—Marcus Charles
(74) *Attorney, Agent, or Firm*—Baker Botts L.L.P.

(57) ABSTRACT

A power transmission has a drive side rotatable member having a plurality of tapered radial concave portions with each having a pair of tapered surfaces. The plurality of tapered radial concave portions are disposed in a radial direction along a radial axis of the drive side rotatable member. A driven side rotatable member is connected to a rotary shaft and has a plurality of radial and axial concave portions disposed in a radial direction along a radial axis of the driven side rotatable member. A plurality of balls are each moveable between each of the plurality of tapered radial concave portions and each of the plurality of radial and axial concave portions. A spring is provided on the driven side rotatable member. Further, a ring having an inclined surface is urged by the spring, whereby the ring presses each of the plurality of balls at a point at which the inclined surface is formed. The ring presses each of the plurality of balls to each of the plurality of tapered radial concave portions and to the driven side rotatable member when torque is transmitted. Further, the ring presses each of the plurality of balls to each of the pairs of tapered surfaces of each of the plurality of tapered radial concave portions and to the inclined surface of the ball pressing ring in order to move each of the balls into each of the plurality of radial and axial concave portions when a torque is interrupted. Accordingly, the present invention has a structure which may maintain torque in an interrupted condition once torque is interrupted.

15 Claims, 14 Drawing Sheets

POWER TRANSMISSION

BACKGROUND OF THE INVENTION

1. Field of the Invention

The present invention relates to a torque limiting power transmission, and more specifically, to a mechanism for a power transmission suitable for use in compressors and other industrial equipment.

2. Description of Related Art

FIGS. 19 and 20 depict a known power transmission as described in JP-A-8-135752. Referring to FIG. 20, an inner lace of ball bearing 24 is fixed to inner cylindrical projecting portion 22A of front housing 22 of compressor 21. Rotor 25 is fixed to an outer race of ball bearing 24. Pulley 26 is fixed to rotor 25, and a first holding member 28 is fixed to pulley 26 by rivets 27. Hub 29 is fixed to shaft 23 of compressor 21 via nut 30. A second holding member 32 is fixed to hub 29 by rivets 31. An elastic ring 33 made from a synthetic resin, or rubber is press-fitted between first holding member 28 and second holding member 32.

Referring to FIG. 19, elastic ring 33 is formed in the shape of a petal, and a plurality of convex portions 33A and concave portions 33B are formed on inner and outer peripheries of elastic ring 33, respectively. A plurality of concave portions 28A and convex portions 28B are formed on a periphery of first holding member 28 corresponding to the plurality of convex portions 33A and concave portions 33B of elastic ring 33. A plurality of concave portions 32A and convex portions 32B are formed on an inner periphery of second holding member 32 corresponding to the plurality of convex portions 33A and concave portions 33B of elastic ring 33.

When a torque is transmitted from pulley 26 to shaft 23 of compressor 21, the respective convex portions 33A and concave portions 33B of elastic ring 33 deform due to compression of the respective concave portions 28A and convex portions 28H of first holding member 28, and the respective concave portions 32A and convex portions 32B of second holding member 32. Thus, the torque is transmitted by a reactive force. When an excessive torque relative to a preset value is generated by, for example, a seizure of compressor 21, elastic ring 33 deforms, decreasing its thickness in the radial direction. As a result, elastic ring 33 slips against concave portions 32A and convex portions 32B of second holding member 32, interrupting the transmission of the torque.

In such a known power transmission, because a plurality of concave portions and convex portions are provided along a radial axis of the first and second holding members respectively, even if the elastic ring slips, causing its convex portions and concave portions to escape from the concave portions and convex portions of the second holding member with which they were originally fitted, they may be re-fitted to the adjacent concave portions and convex portions of the second holding member, and the torque may be transmitted again.

Further, in such a known power transmission, because the elastic modulus of the elastic ring varies depending on the temperature of an area along a radial axis of the first and second holding members, respectively, the torque limiter may become unstable.

SUMMARY OF THE INVENTION

It is an object of the present invention to provide a stable power transmission, which may be unaffected by variation of the temperature of an area along a radial axis of the first and second holding members. It is another object of the present invention to provide a stable power transmission. It is yet another object of the present invention to prevent foreign material from entering the transmission. It is still another object of the present invention to prevent abrasion and rust. It is a further object of the present invention to maintain a torque interrupted condition once a torque is interrupted.

According to one embodiment of the invention, a power transmission has a drive side rotatable member having a plurality of tapered radial concave portions with each having a pair of tapered surfaces. The plurality of tapered radial concave portions are disposed in a radial direction along a radial axis of the drive side rotatable member. A driven side rotatable member is connected to a rotary shaft and has a plurality of radial and axial concave portions disposed in a radial direction along a radial axis of the driven side rotatable member. A plurality of balls are each moveable between each of the plurality of tapered radial concave portions and each of the plurality of radial and axial concave portions. A spring is provided on the driven side rotatable member. Further, a ring having an inclined surface is urged by the spring, whereby the ring presses each of the plurality of balls at a point at which the inclined surface is formed. The ring presses each of the plurality of balls to each of the plurality of tapered radial concave portions and to the driven side rotatable member when torque is transmitted. Further, the ring presses each of the plurality of balls to each of the pairs of tapered surfaces of each of the plurality of tapered radial concave portions and to the inclined surface of the ball pressing ring in order to move each of the balls into each of the plurality of radial and axial concave portions when a torque is interrupted. Accordingly, the present invention has a structure which may maintain torque in an interrupted condition once torque is interrupted.

Further, the driven side rotatable member may have an axial interior concave portion connected to each of the plurality of radial and axial concave portions, such that when torque is interrupted, each of the plurality of balls moves into the axial interior concave portion each of the plurality of radial and axial concave portions, thereby preventing each of the plurality of balls from moving radially.

In yet another embodiment, the drive side rotatable member may include a pulley, an outer ring fixed to the pulley, an inner ring pressing against each of the plurality of balls, and an elastic rubber member connecting the outer ring and the inner ring.

In a still another embodiment, the spring may be a belleville spring. An urging force of such a belleville spring presses against the ball pressing ring. The urging force may be adjusted by means of an adjusting screw.

In a further embodiment, a first seal member may provide a seal between an inner peripheral surface of the drive side rotatable member and a peripheral surface of the driven side rotatable member. A second seal member may provide a seal between the inner peripheral surface of the drive side rotatable member and a peripheral surface of the ball pressing ring, thereby forming an enclosed space.

In still a further embodiment, an enclosed area may be formed between a rubber member and the driven side rotatable member by creating a seal between an inner peripheral surface of the rubber member and a peripheral surface of the driven side rotatable member. An enclosed area also may be formed between a rubber member and the ball pressing ring by creating a seal between the inner peripheral surface of the rubber member and a peripheral surface of the ball pressing ring.

Further, an enclosed area may be formed between a ring-like seal member-fixed to the inner ring and the driven side rotatable member by creating a seal between the ring-like seal member-fixed to the inner ring and a peripheral surface of the driven side rotatable member and an enclosed area may be formed between between the rubber member and the ball pressing ring by creating a seal between an inner peripheral surface of the rubber member and a peripheral surface of the ball pressing ring.

In yet a further embodiment, an enclosed area may be formed between the rubber member and the driven side rotatable member by creating a seal between an inner peripheral surface of the rubber member and an enclosed area may be formed between the driven side rotatable member and a ring-like seal member-fixed to the inner ring by providing a seal between a peripheral surface of the driven side rotatable member and the ring-like seal member-fixed to the inner ring and a peripheral surface of the ball pressing ring. A preservative or lubricant may be filled in the enclosed area.

A gap also may be formed between the outer ring and the pulley, such that the enclosed area may be maintained even if the outer ring, the rubber member, and the inner ring are moved toward the pulley. Alternatively, a gap may be formed between the driven side rotatable member and the rotary shaft, such that the enclosed area may be maintained even if the driven side rotatable member, the plurality of balls, and the ball pressing ring are moved toward the pulley. Moreover, a gap may be formed between the driven side rotatable member and the ball pressing ring, such that an urging force of the spring acts upon each of the plurality of balls via the ball pressing ring even when each of the plurality of balls moves into the axial interior concave during a torque interruption.

Further, the inclined surface of the ball pressing ring may have an upper surface and a lower surface. The upper surface. may press against each of the plurality of balls before each of the plurality of balls is moved from each of the plurality of tapered radial concave portions to each of the plurality of radial and axial concave portions by each of the pairs of tapered surfaces of each of the plurality of tapered radial concave portions. Moreover, the lower surface may press against each of the plurality of balls after each of the plurality of balls is moved from each of the plurality of tapered radial concave portions to each of the plurality of radial and axial concave portions by each of the pairs of tapered surfaces of each of the plurality of tapered radial concave portions. In addition, an inclined angle of the lower surface may be less than an inclined angle of the upper surface.

In addition, a first torque may be generated when each of the plurality of balls begins to be moved from each of the plurality of tapered radial concave portions to each of the plurality of radial and axial concave portions by each of the pairs of tapered surfaces of each of the plurality of tapered radial concave portions. This first torque may be substantially equivalent to a second torque, which may be generated when each of the plurality of balls no longer presses against each of the one pairs of tapered surfaces of each of the plurality of tapered radial concaves. Moreover, a depth of the axial interior concave may be selected, such that an urging force of the spring acts upon each of the plurality of balls via the ball pressing ring even when each of the plurality of balls moves into the axial interior concave during a torque interruption.

Other objects, features, and advantages will be apparent to persons of ordinary skill in the art in view of the following detailed description of the invention and the accompanying drawings.

DESCRIPTION OF PREFERRED EMBODIMENTS

Figure 1:
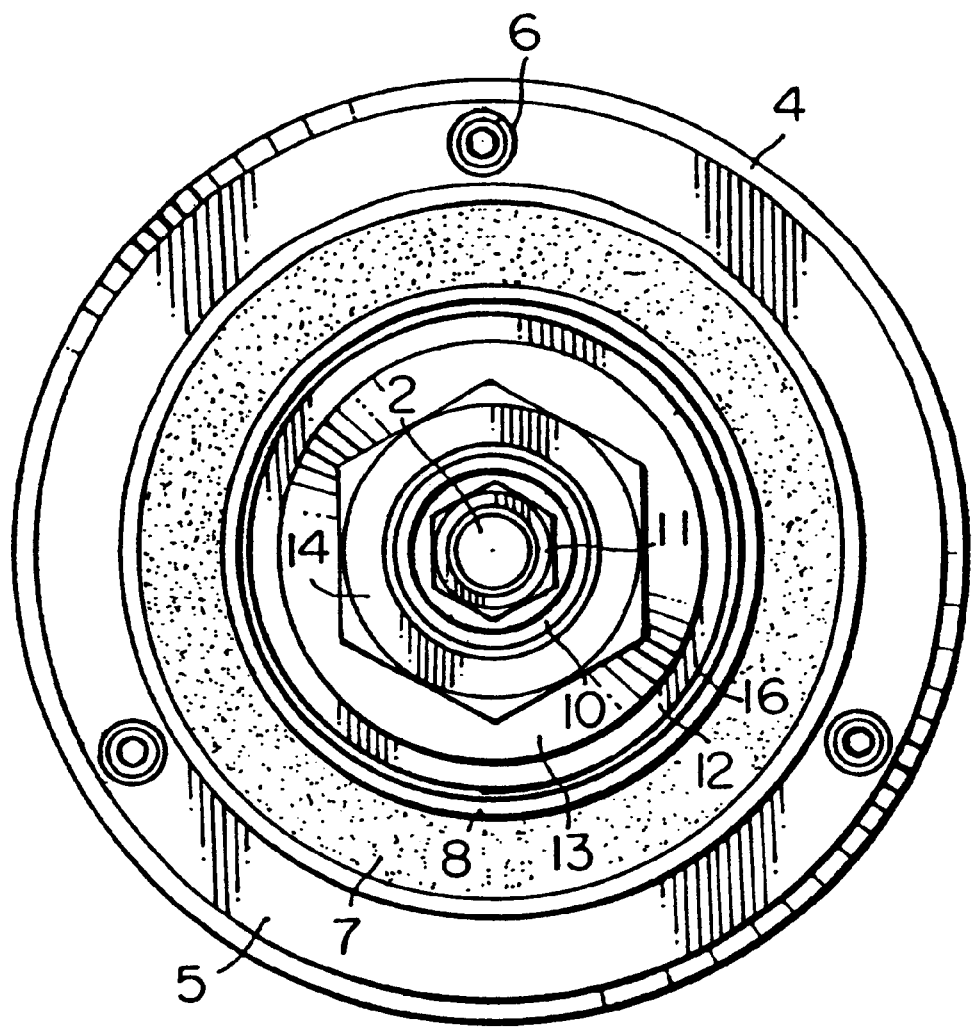
FIG. 1 is an elevational view of a power transmission according to a first embodiment of the present invention.

With reference to FIGS. 1–5, a power transmission according to a first embodiment of the present invention is described. In this embodiment, the power transmission is used as a torque limiter for a compressor. An inner lace of ball bearing 3 is fixed to housing 1a of compressor 1, and pulley 4 is fixed to an outer lace of ball bearing 3. Rotary shaft 2 of compressor 1 is disposed coaxially with pulley 4. Outer ring 5 is fixed to a side surface of pulley 4 via bolts 6. Inner ring 8 is disposed inside outer ring 5. Outer ring 5 and inner ring 8 are connected to each other by elastic rubber ring 7. Elastic rubber ring 7 is bonded to outer ring 5 and inner ring 8, respectively, by vulcanization adhesion. The elastic rubber ring 7 provides cushioning. A plurality of tapered radial concave portions 8a are formed on an inner surface of inner ring 8 and are arranged at a predetermined interval in a radial direction along a radial axis. The plurality of tapered radial concave portions 8a each have a pair of tapered surfaces 8b symmetrically formed in a radial direction along a radial axis. Each plurality of tapered radial concave portions 8a may contain therein one ball 9.

Hub 10 is provided on an end portion of rotary shaft 2, and shaft attachment portion 10a of hub 10 is fixed to shaft 2 via nut 11. A plurality of radial and axial concave portions 10b may each store one ball 9. The plurality of radial and axial concave portions 10b are formed on hub 10 and are arranged at a set interval in a radial direction along a radial axis. Further, axial interior concave portion 10c is formed so as to connect each of radial and axial concave portions 10b.

Figure 2:
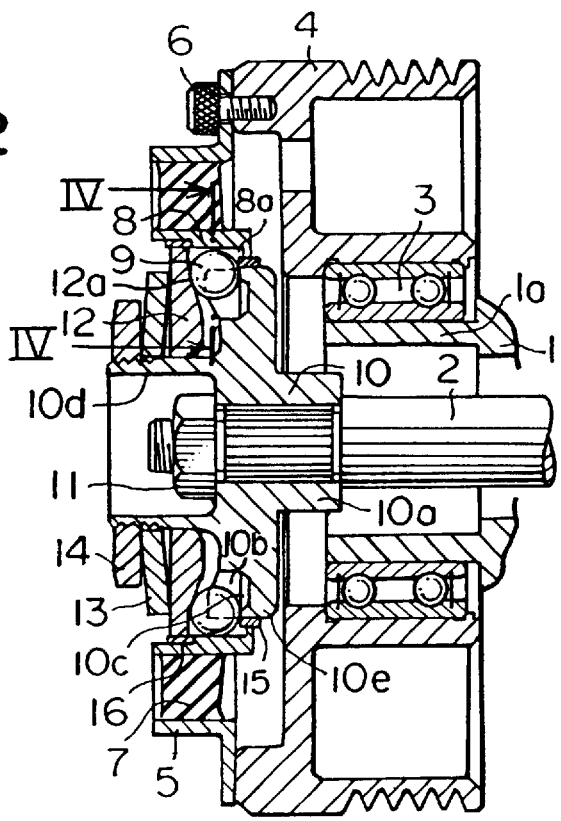
FIG. 2 is a cross-sectional view of the power transmission of FIG. 1, depicting a torque transmitting condition.
Figure 3:
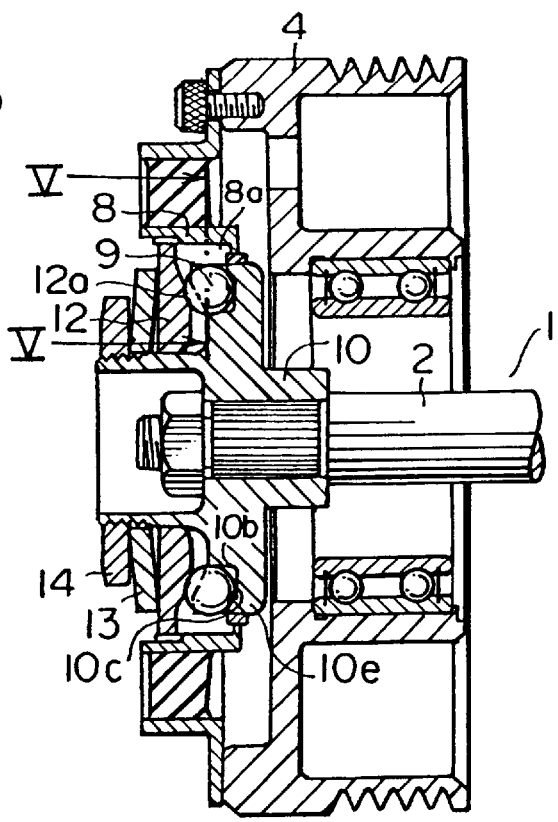
FIG. 3 is a cross-sectional view of the power transmission of FIG. 1, depicting a torque interrupted condition.
Figure 4:
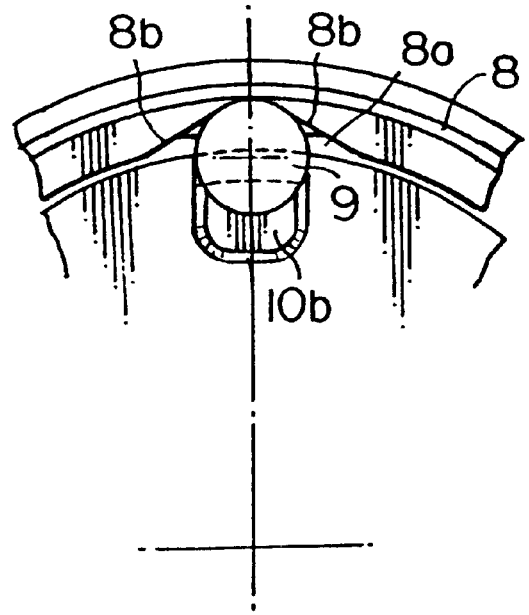
FIG. 4 is an enlarged, partial, elevational view of a main portion of the power transmission of FIG. 2, as viewed along line IV—IV of FIG. 2.
Figure 5:
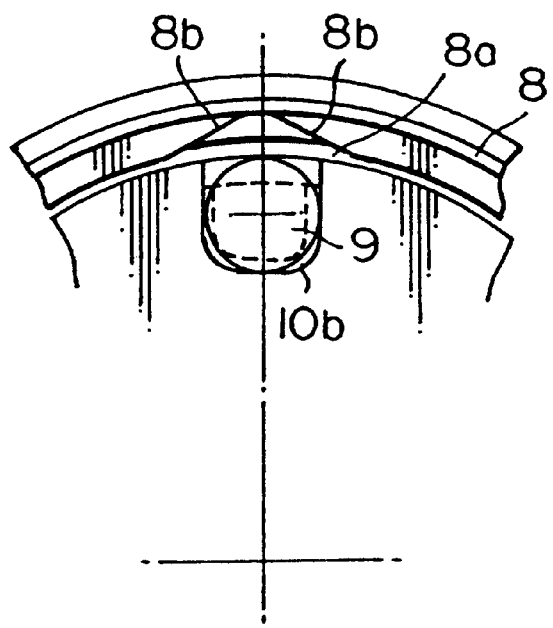
FIG. 5 is an enlarged, partial, elevational view of a main portion of the power transmission of FIG. 3, as viewed along line V—V of FIG. 3.

When a torque is transmitted, as depicted in FIGS. 2 and 4, each ball 9 is positioned over each corresponding tapered radial concave portion 8a, and each corresponding radial and axial concave portion 10b. When a torque is interrupted, as depicted in FIGS. 3 and 5, each ball 9 moves into each corresponding radial and axial concave 10b, and further moves into each corresponding axial interior concave portion 10c.

Ball pressing ring 12 and belleville spring 13 are fitted onto projecting cylindrical portion 10d of hub 10 and are fixed by nut 14. The urging force of belleville spring 13 against ball pressing ring 12 is controlled by nut 14, and may be adjusted by either loosening or tightening nut 14. Inclined surface 12a is formed on ball pressing ring 12 for moving and pressing each ball 9 against inner ring 8, which is disposed radially outside ball pressing ring 12, and against hub 10, which is disposed axially relative to ball pressing ring 12. Ring-like seal member 15 is interposed between inner ring 8 and radially projecting portion 10e of hub 10. Ring-like seal member 16 is interposed between inner ring 8 and ball pressing ring 12. Enclosed areas are formed by sealing seal members 15 and 16. Preservative or lubricant is filled into the enclosed space.

The dynamic relationship between each of the pairs of tapered surfaces 8b of each plurality of tapered radial concave portions 8a of inner ring 8 (any one of the pairs of taper surfaces 8b, depending upon the rotational direction of pulley 4), and inclined surface 12a of ball pressing ring 12, along with the movement of each ball 9, is now explained. Inclined surface 12a presses each ball 9 in a direction perpendicular to inclined surface 12a with a force P1, which is dependent upon the urging force of belleville spring 13. The force P1 may be divided into a component force $P1r$ for pressing each ball 9 radially outward, and a component force $P1h$ for pressing each ball 9 axially right, as depicted in FIG. 4. Each of the pairs of tapered surfaces 8b presses each ball 9 in a direction perpendicular to each of the pairs tapered surfaces 8b with a force P2. The force P2 can be divided into a component force $P2r$ for pressing each ball 9 radially inward, and a component force $P2h$ for pressing each ball 9 axially right, as depicted in FIG. 5. FIG. 4 depicts an embodiment whereby inner ring 8 rotates in a clockwise direction. When $P1r > P2r$, each of the pairs of tapered surfaces 8b press against each ball 9, and a torque is transmitted, as depicted in FIG. 4. When $P1r < P2r$, each of the pairs of tapered surfaces 8b moves each ball 9 in a radially inward direction, and a torque is interrupted, as depicted in FIG. 5.

When the torque is transmitted, as shown in FIGS. 2 and 4, each ball 9 presses against each of the pairs of tapered surfaces 8b of each plurality of tapered radial concave portions 8a of inner ring 8, radially projecting portion 10e of hub 10, and inclined surface 12a of ball pressing ring 12. Therefore, the rotation of pulley 4 is transmitted to rotary shaft 2 of compressor 1 through bolts 6, outer ring 5, rubber ring 7, inner ring 8, each ball 9, projecting portion 10e of hub 10, and shaft attachment portion 10a of hub 10.

When an excessive torque relative to a preselected torque is generated by, for example, a seizure of compressor 1, the condition depicted in FIGS. 2 and 4 is not maintained, the excessive torque is interrupted, as depicted in FIGS. 3 and 5. Each of the pairs of tapered surfaces 8b of each plurality of tapered radial concave portions 8a of inner ring 8 (any one of the pairs of tapered surfaces 8b, depending upon the rotational direction of pulley 4) presses against each ball 9, and each ball 9 moves into radial and axial concave 10b portion of hub 10, as depicted in FIGS. 3 and 5. In this embodiment, because each ball 9 may slightly return radially outward, after the movement of each ball 9, each of the pairs of tapered surfaces 8b and inclined surface 12a of ball pressing ring 12, further move each ball 9 into axial interior concave portion 10c. Thus, this embodiment of the invention may prevent each ball 9 from returning radially outward.

During the movement of each ball 9, ball pressing ring 12 temporarily moves in a lefthand direction due to the pressing force applied from the side of each ball 9 to inclined surface 12a, as depicted in FIG. 2. Thereafter, each ball 9 moves into radial and axial concave portion 10b and further into axial interior concave portion 10c. Because of the movement of each ball 9, and because inner ring 8 and each ball 9 are separated from one another, the rotation of pulley 4 is not transmitted to rotary shaft 2 of compressor 1. Thus, an excessive torque may be interrupted.

Figure 6:
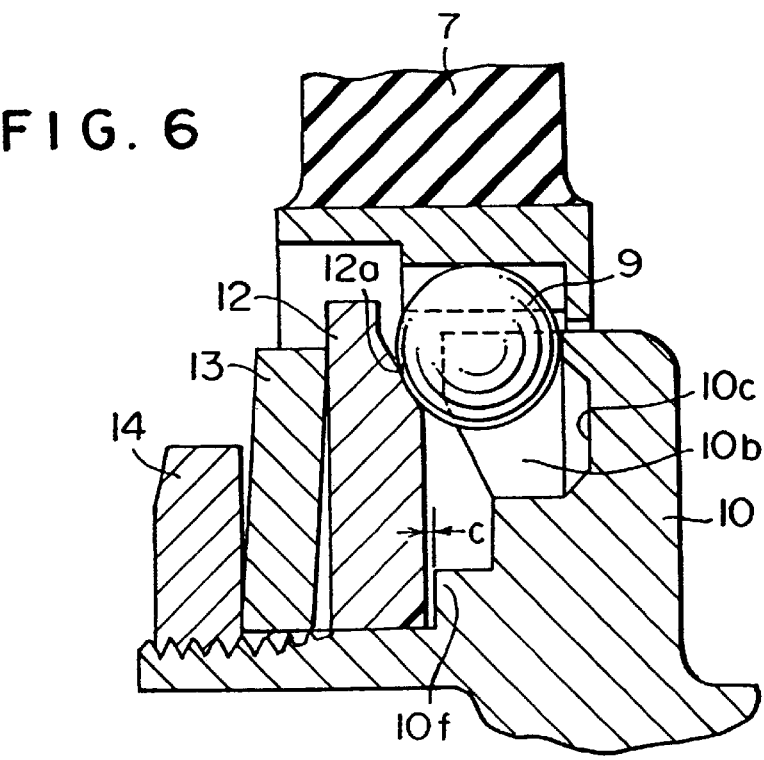
FIG. 6 is a partial, cross-sectional view of a power transmission according to a second embodiment of the present invention.

FIG. 6 depicts a power transmission according to a second embodiment of the present invention. This embodiment has features substantially similar to those of the first embodiment. Therefore, those features that are different will be discussed in detail below.

In this embodiment, a gap C is formed between hub 10 and ball pressing ring 12, such that an urging force of spring 13 acts upon each ball 9 via ball pressing ring 12. This urging force acts upon each ball 9 even while each ball 9 is moving into axial interior concave 10c during torque interruption. Specifically, the axial length of receiving portion 10f of hub 10 may be set at an appropriate length such that an urging force of belleville spring 13 may press ball pressing ring 12 against each ball 9, even while each ball 9 is moving into axial interior concave portion 10c. The size of gap C formed between ball pressing ring 12 and receiving portion 10f of hub 10 is preferably set at a minimum so that the force of inclined surface 12a for pressing each ball 9 radially outwardly is not altered. In this embodiment, a release of nut 14 may be prevented because an axial urging force of spring 13 may act upon pressing ring 12 even after a torque has been interrupted.

FIGS. 7–12 depict a power transmission according to a third embodiment of the present invention. This embodiment has features substantially similar to those of the first embodiment. Therefore, those features that are different will be discussed in detail, below.

Figure 7:
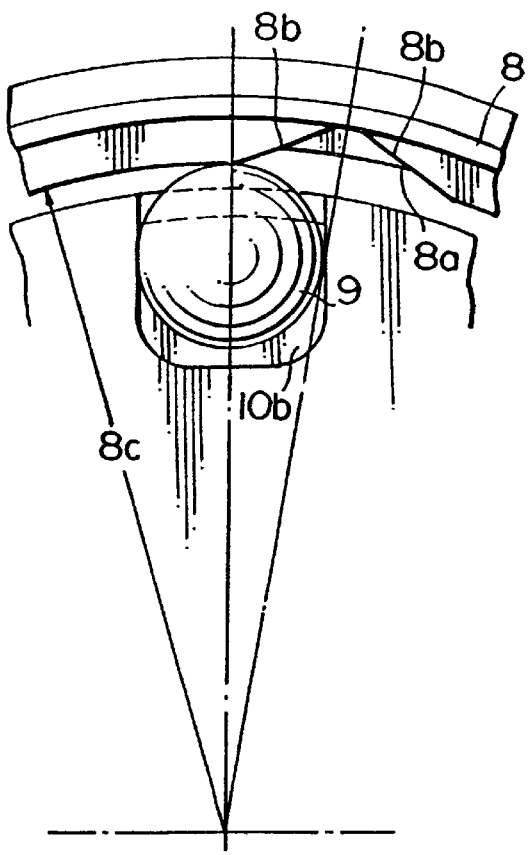
FIG. 7 is a partial, elevational view of a main portion of a power transmission according to a third embodiment of the present invention.
Figure 8:
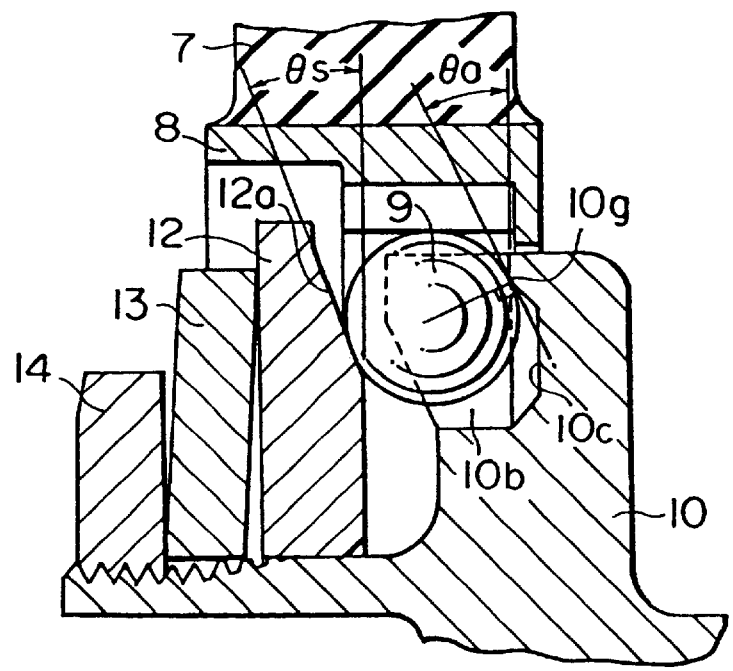
FIG. 8 is a partial, cross-sectional view of the power transmission of FIG. 7, depicting a torque interrupted condition.

When a torque is transmitted, as depicted in FIGS. 2 and 4, each ball 9 presses against each of the pairs of tapered surfaces 8b of inner ring 8 and inclined surface 12a of ball pressing ring 12. When a torque is interrupted, as depicted in FIG. 7, each ball 9 may move to a position of inner diameter 8c of inner ring 8 in a radial and axial direction. As depicted in FIG. 8, in this embodiment, whether each ball 9 moves into axial interior concave 10c of hub 10 depends on the relationship between an angle θs, formed between inclined surface 12a of ball pressing ring 12 and a radial line, and an angle θa, formed between a tangential line at a contact point of each ball 9 and ball receiving edge portion 10g of hub 10 and a radial line.

Figure 9:
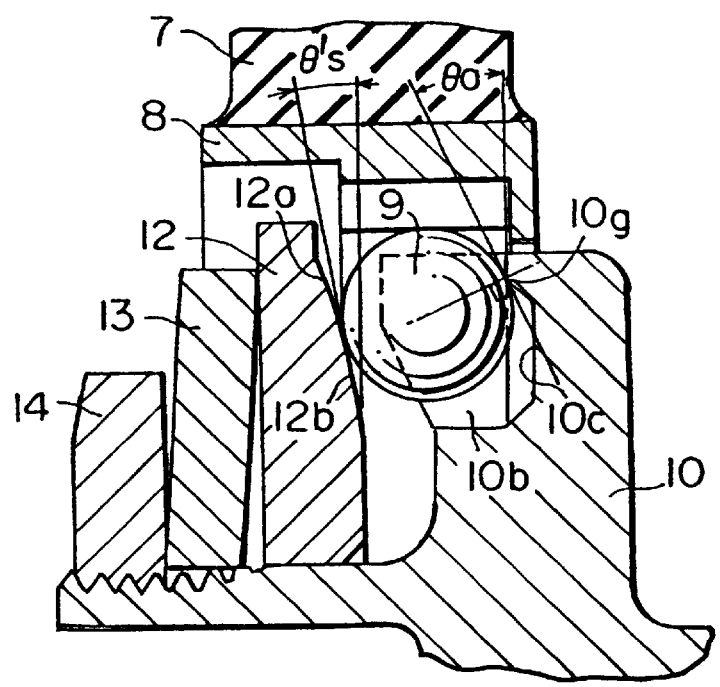
FIG. 9 is a partial, cross-sectional view of a power transmission according to a modification of the power transmission of FIG. 8, depicting a torque interrupted condition.

FIG. 9 depicts a modification of the above-described third embodiment. Therefore, those differences will be discussed in detail, below. In this modification, an inclined surface 12a of an upper surface of ball pressing ring 12, with inclined surface 12a having an inclined angle θs, and an inclined surface 12b of a lower portion of ball bearing ring 12, with inclined surface 12b having an inclined angle θs', are provided. Inclined angle θs' is smaller than inclined angle θs, and is formed so as to be connected to inclined surface 12b. When angle θa is greater than either angle θs or θs', each ball 9 moves in a radially inward and axial direction. In the modified embodiment, because the angle of the inclined surface 12b of ball pressing ring 12 pressing against each ball 9 is smaller than the inclined angle 12a of ball pressing ring 12, once the transmission of a torque has started, each ball 9 may more surely move from each of the plurality of tapered radial concaves 8a toward a radially inward and axial direction by each of the pairs of tapered surfaces 8b.

In this embodiment, and the modification of this embodiment, respectively, a release of nut 14 may be prevented by setting an appropriate depth of axial interior concave 10c, such that the axial urging force of belleville spring 13 may act even once each ball 9 has moved into axial interior concave 10c at torque interruption. Alternatively, a release preventing means, such as a rock member, may also be employed with nut 14, to more surely prevent the release of nut 14.

When a torque to be interrupted is selected at a low torque, the axial urging force of belleville spring 13 is usually selected even lower. In this case, the probability that nut 14 may release is increased. Therefore, in such a case, the release preventing means, such as a rock member, may be preferable to prevent such a release.

Figure 10:
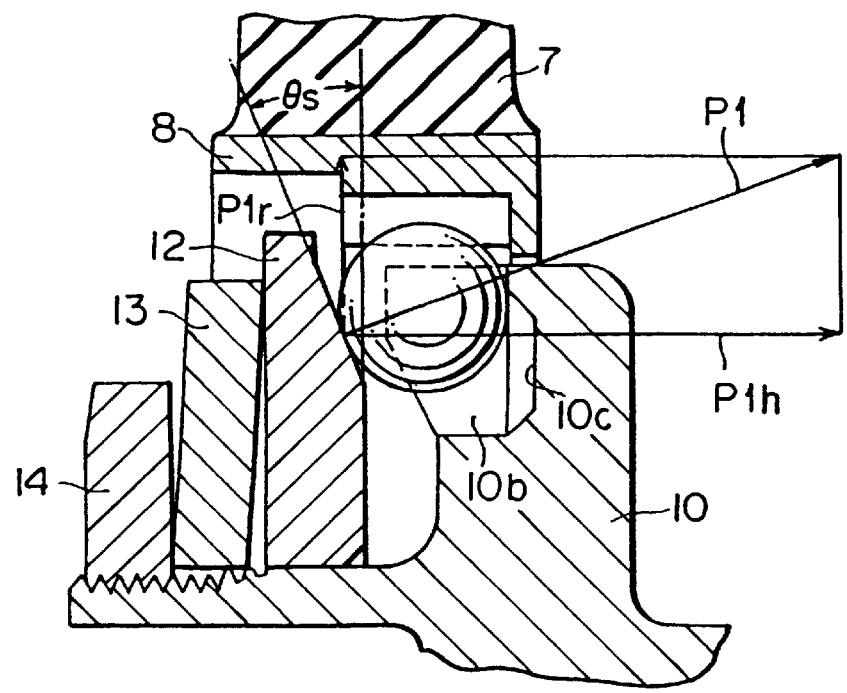
FIG. 10 is a partial, cross-sectional view of the power transmission of FIG. 8, demonstrating a dynamic relationship at the torque interrupted condition.
Figure 11:
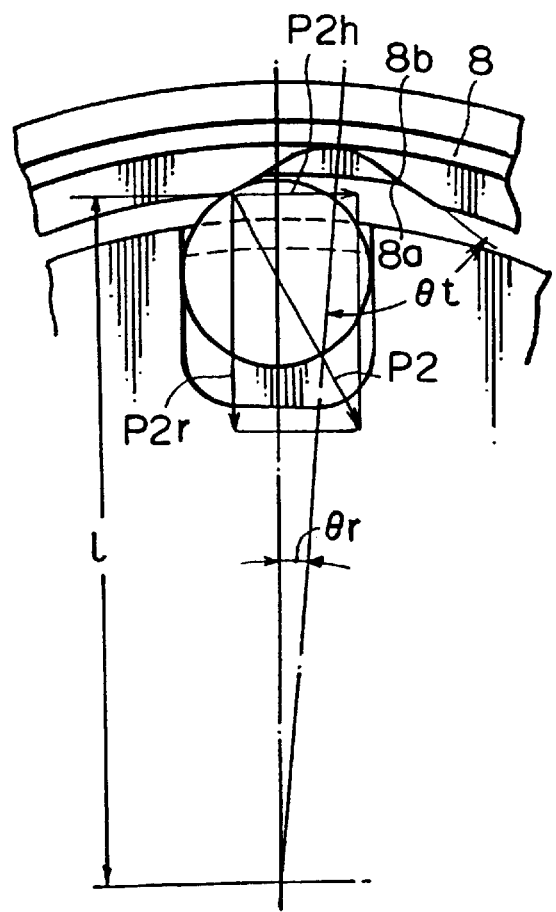
FIG. 11 is a partial, elevational view of the power transmission of FIG. 8, demonstrating a dynamic relationship at the torque interrupted condition.

When a torque is interrupted, each ball 9 starts to move in the radially inward and axial direction by each of the pairs of tapered surfaces 8b of each plurality of tapered radial concaves 8a of inner ring 8. At that time, as depicted in FIGS. 10 and 11, as each ball 9 moves, an angle shift (θr) occurs between each plurality of tapered radial concaves 8a of inner ring 8 and each radial and axial concave portions 10b of hub 10. Therefore, the force for moving each ball 9 in the radially inward and axial direction may increase. If the increase in the force moving each ball 9 in the radially inward and axial direction is substantially equivalent to the increase in the force suppressing the movement of each ball 9 by inclined surface 12a, or alternatively, by inclined surfaces 12a and 12b, of ball pressing ring 12, the driving torque operating from the start of torque interruption to the completion of torque interruption may be maintained at a substantially constant value.

Referring to FIGS. 10 and 11, the angle θr is formed between a radial line and a center line of each of the plurality of tapered radial concave portions 8a. An angle θt formed between the center line of tapered radial concave θa and each of the pairs of tapered surfaces 8b. A distance "1" is formed from the center of hub 10 to a point of each of the pairs of tapered surfaces 8b pressing against each ball 9 with a force P2, and a torque T is transmitted. In FIGS. 10 and 11, the following relationships exist:

$P2r = P2h \times \tan(\theta r + \theta t)$ and $T = P2h \times 1$

Therefore, the following equation (1) may be satisfied.

$$P2r = (T/1)\tan(\theta r + \theta t) \tag{1}$$

When $P2r = P1r$, the equation ($P1r = P1h \times \tan(\theta s)$) may also be satisfied. Therefore, the following equations (2) and (3) also may be satisfied.

$$(T/1)\tan(\theta r + \theta t) = P1h \times \tan(\theta s) \tag{2}$$

$$T = (n \times P1h \times \tan(\theta s)) / \tan(\theta r + \theta t) \tag{3}$$

The values of "n" and P1h vary depending upon the movement of ball 9 by the angle shift θr. If the increase in P1h due to the variation of "n" is appropriate, T may be maintained at a substantially constant value relative to the angle shift θr.

Figure 12:
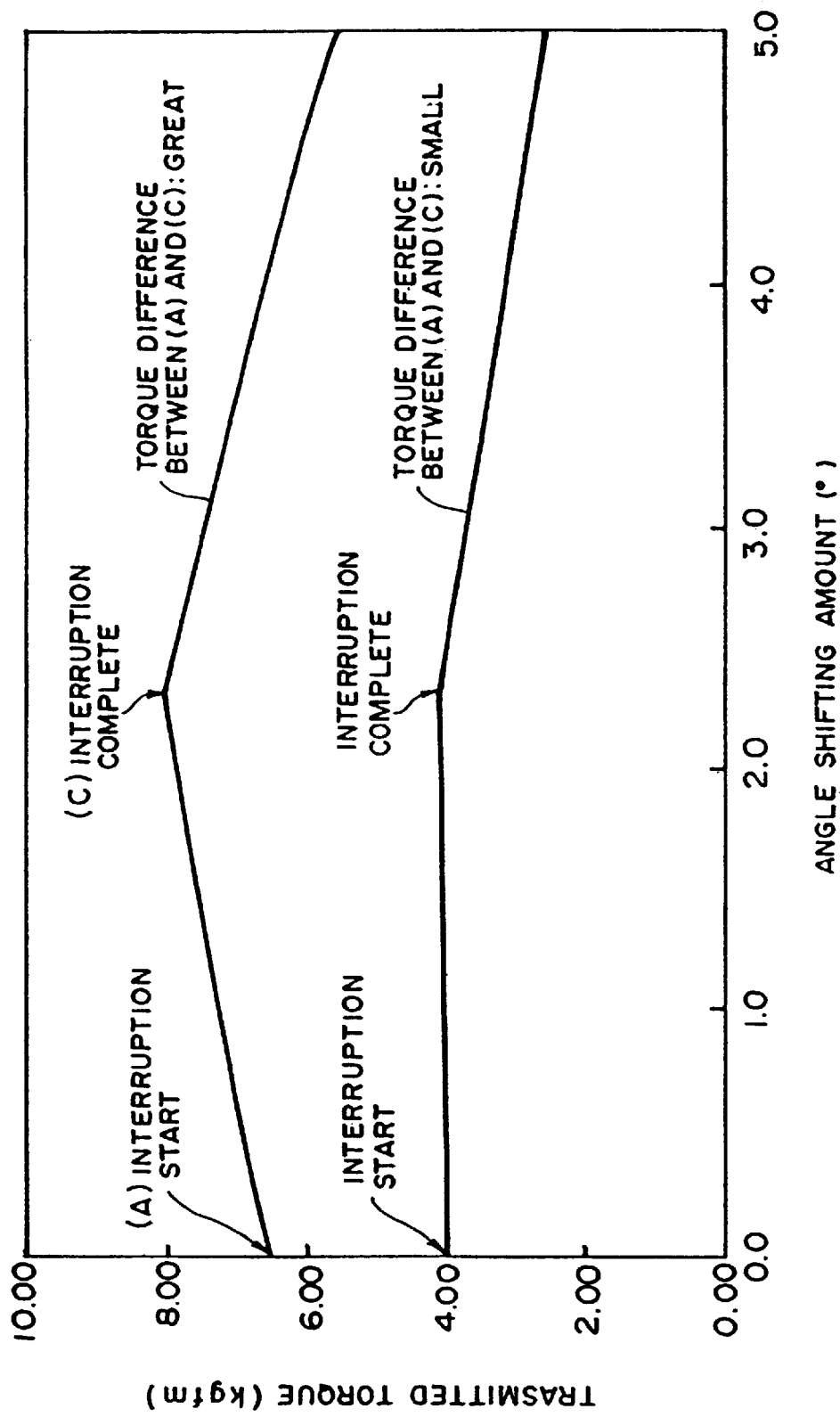
FIG. 12 is a graph showing a relationship between a transmitted torque and an angle shifting amount in the power transmission of FIG. 7.
Figure 13:
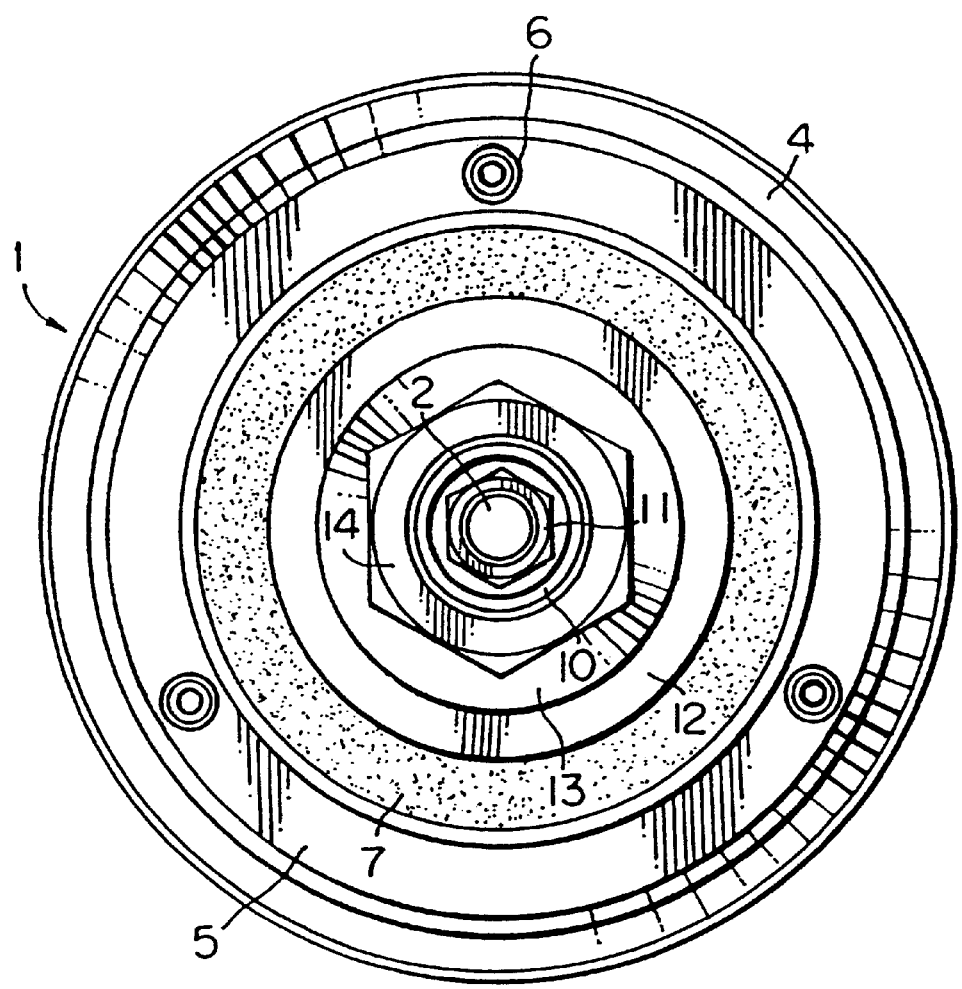
FIG. 13 is an elevational view of a power transmission according to a fourth embodiment of the present invention.

FIG. 12 depicts the relationship between the transmitted torque and the angle shifting amount. When the difference between a torque from the start of interruption (A) and a torque at time of completion interruption (C) is small, the transmitted torque is substantially a flat line relative to the angle shifting amount. As the torque difference increases, the transmitted torque becomes substantially less of a flat line relative to the angle shifting amount.

FIGS. 13–18 depict a power transmission according to a fourth embodiment of the present invention. This embodiment has features substantially similar to those of the first embodiment. Therefore, only those features that are different will be discussed.

Figure 14:
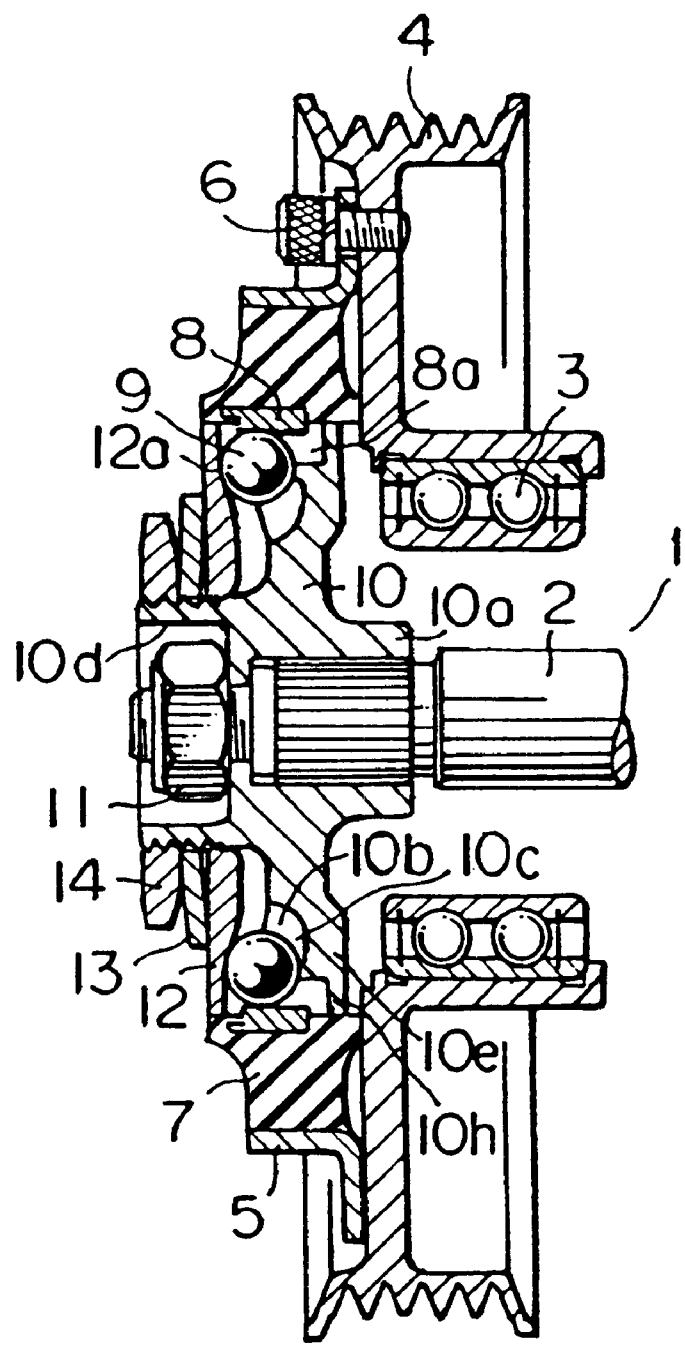
FIG. 14 is a cross-sectional view of the power transmission of FIG. 13, depicting a torque transmitting condition.

Referring to FIG. 14, a peripheral surface of flange 10h of hub 10 is pressed against an inner peripheral surface of rubber ring 7, and a peripheral surface of ball pressing ring 12 also is pressed against the inner peripheral surface of rubber ring 7. In this embodiment, foreign material does not enter from the outside into a closed space formed by hub 10, rubber ring 7, and ball pressing ring 12. Therefore, the torque interruption function of the power transmission may be unaffected by foreign material. Further, when lubricant, such as grease or preservative, is enclosed in the closed space, abrasion and rusting of the torque interrupting mechanism of the power transmission may be prevented.

Figure 15:
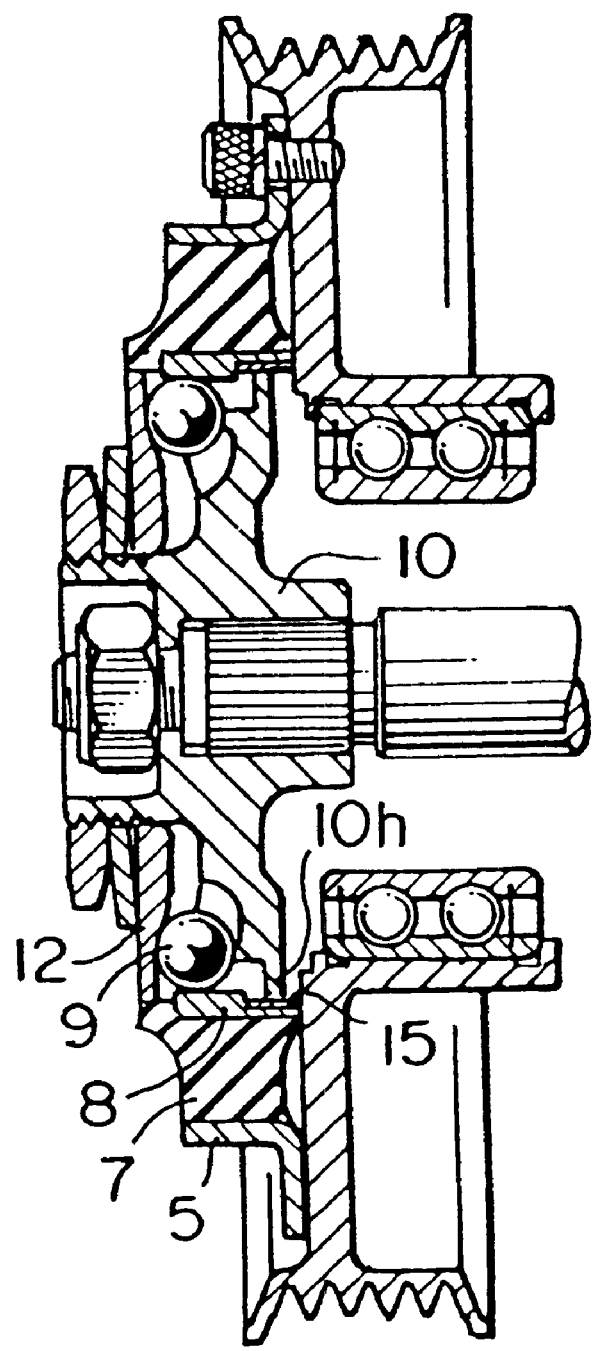
FIG. 15 is a cross-sectional view of a power transmission according to a first modification of the power transmission of FIG. 14, depicting a torque transmitting condition.

FIG. 15 depicts a first modification of the above-described fourth embodiment. This embodiment has features substantially similar to those of the fourth embodiment. Therefore, only those features that are different will be discussed. In this modification, the peripheral surface of flange 10h of hub 10 is pressed against an inner peripheral surface of ring-like seal member 15 fixed to an inside portion (a portion near the compressor) of an inner peripheral surface of inner ring 8.

Figure 16:
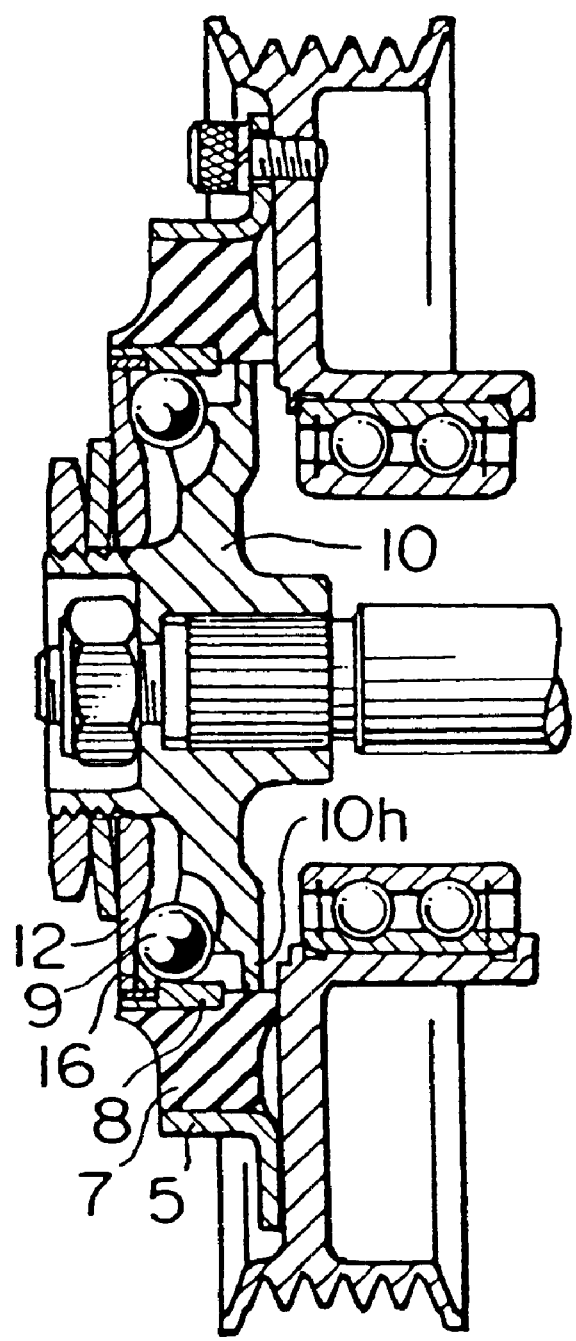
FIG. 16 is a cross-sectional view of a power transmission according to a second modification of the power transmission of FIG. 14, depicting a torque transmitting condition.

FIG. 16 depicts a second modification of the above-described fourth embodiment. This embodiment has features substantially similar to those of the fourth embodiment.

Therefore, only those features that are different will be discussed. In this modification, the peripheral surface of ball pressing ring 12 is pressed against an inner peripheral surface of ring-like seal member 16 fixed to an outside portion (a portion far away from the compressor) of the inner peripheral surface of inner ring 8.

Figure 17:
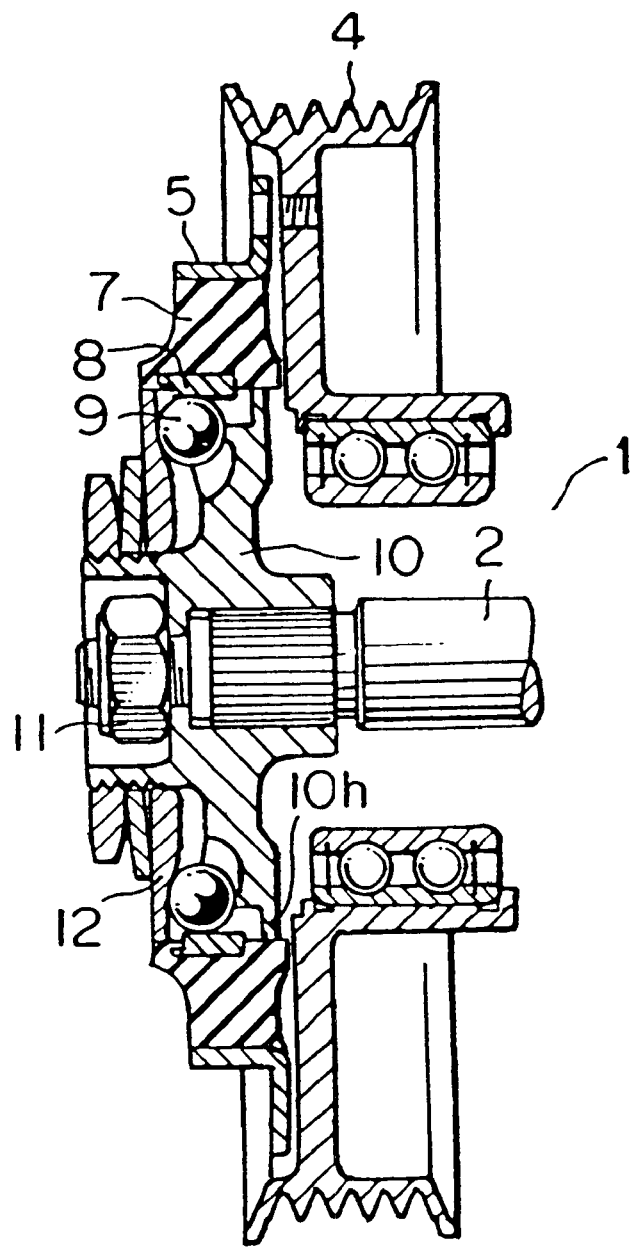
FIG. 17 is a cross-sectional view of the power transmission of FIG. 14, depicting a gap generating condition between an outer ring and a pulley.

FIG. 17 depicts a third modification of the above-described 4th Embodiment. This embodiment has features substantially similar to those of the fourth embodiment. Therefore, only those features that are different will be discussed. In this modification, a gap D is formed between outer ring 5 and pulley 4. When bolts 6 are screwed into pulley 4 through outer ring 5, outer ring 5, rubber ring 7, and inner ring 8 move toward pulley 4. At that time, a seal between the peripheral surface of flange 10h of hub 10 and the inner peripheral surface of rubber ring 7, and a seal between the peripheral surface of ball pressing ring 12 and the inner peripheral surface of rubber ring 7, may be maintained, respectively.

Figure 18:
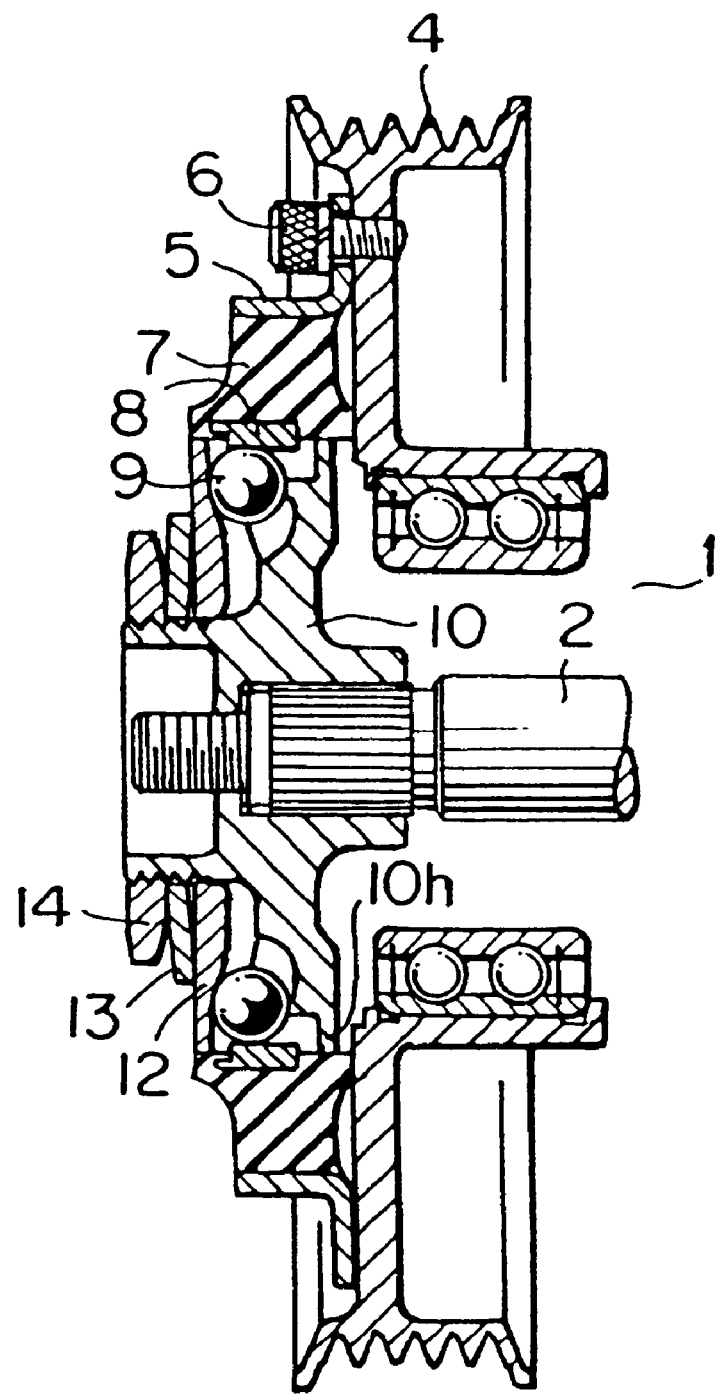
FIG. 18 is a vertical sectional-view of the power transmission of FIG. 14, depicting a gap generating condition between a hub and a rotary shaft of a compressor.
Figure 19:
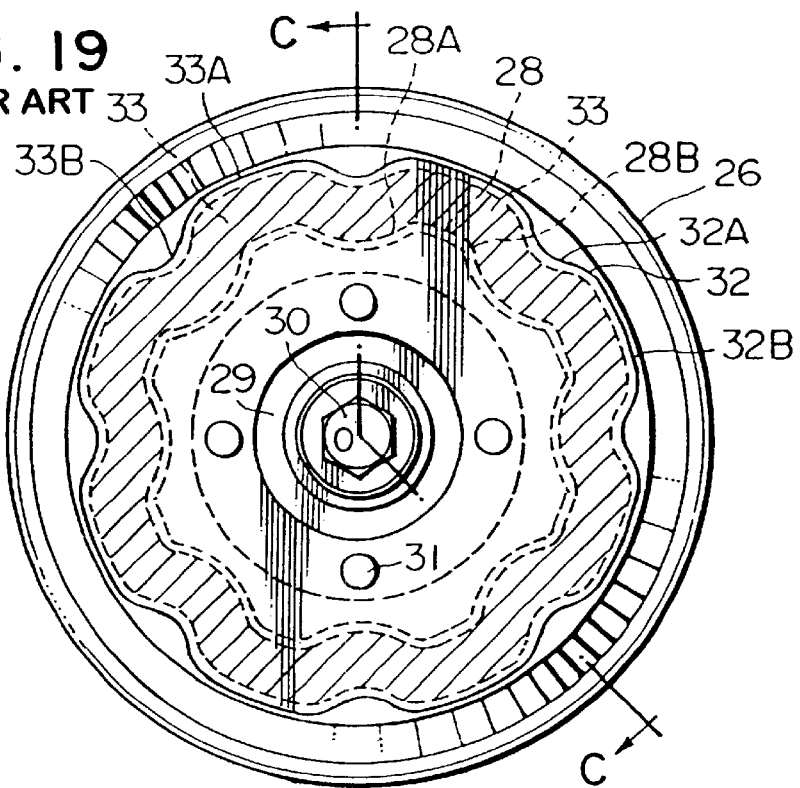
FIG. 19 is an elevational view of a known power transmission.
Figure 20:
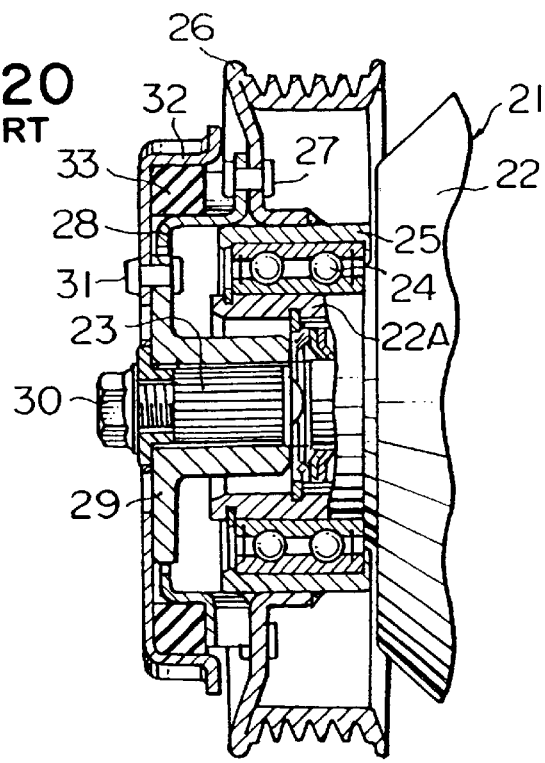
FIG. 20 is a cross-sectional view of the known power transmission of FIG. 19.

FIG. 18 depicts a fourth modification of the above-described fourth embodiment. This embodiment has features substantially similar to those of the fourth embodiment. Therefore, only those features that are different will be discussed. In this modification, a gap is formed between hub 10 and rotary shaft 2 of compressor 1. When nut 11 is threaded onto rotary shaft 2 of compressor 1, hub 10, balls 9, ball pressing ring 12, belleville spring 13, and nut 14 move toward pulley 4. At that time, a seal between the peripheral surface of flange 10h of hub 10 and the inner peripheral surface of rubber ring 7, and a seal between the peripheral surface of ball pressing ring 12 and the inner peripheral surface of rubber ring 7, may be maintained, respectively.

This invention has been described in connection with preferred embodiments. These embodiments, however, are merely exemplary, and the invention is not intended to be restricted thereto. It will be understood by those of skill in the art that variations may be readily made within the scope of this invention, as defined by the appended claims.

What is claimed is:

1. A power transmission comprising:
   a drive side rotatable member having a plurality of tapered radial concave portions, each of said portions having a pair of tapered surfaces, said plurality of tapered radial concave portions being disposed in a radial direction along a radial axis of said drive side rotatable member;
   a driven side rotatable member connected to a rotary shaft and having a plurality of radial and axial concave portions disposed in a radial direction along a radial axis of said driven side rotatable member;
   a plurality of balls each movable between each of said plurality of tapered radial concave portions and each of said plurality of radial and axial concave portions;
   a spring provided on said driven side rotatable member; and
   a ring having an inclined surface urged by said spring, wherein said ring presses each of said plurality of balls at a point at which said inclined surface is formed, and said ring presses each of said plurality of balls to each of said plurality of tapered radial concave portions and to said driven side rotatable member when torque is transmitted, and said ring presses each of said plurality of balls to each of said pairs of tapered surfaces of each of said plurality of tapered radial concave portions and to said inclined surface of said ring for moving each of said plurality of balls into each of said plurality of radial and axial concave portions when a torque is interrupted.

2. The power transmission of claim 1, wherein said driven side rotatable member has an axial interior concave portion connected to each of said plurality of radial and axial concave portions, such that when a torque is interrupted, each of said plurality of balls moves into said axial interior concave portions in each of said plurality of radial and axial concave portions, thereby preventing each of said plurality of balls from moving radially.

3. The power transmission of claim 2, wherein a gap is formed between said driven side rotatable member and said ball pressing ring, such that an urging force of said spring acts upon each of said plurality of balls via said ball pressing ring when each of said plurality of balls is moved into said axial interior concave portion during a torque interruption.

4. The power transmission of claim 2, wherein a depth of said axial interior concave portion is selected, such that an urging force of said spring acts upon each of said plurality of balls via said ball pressing when each of said plurality of balls is moved into said axial interior concave portion during a torque interruption.

5. The power transmission of claim 1, wherein said drive side rotatable member includes a pulley, an outer ring fixed to said pulley, an inner ring pressing against each of said plurality of balls, and an elastic rubber member connecting said outer ring and said inner ring.

6. The power transmission of claim 5, wherein an enclosed area is formed between a ring-like seal member-fixed to said inner ring and said driven side rotatable member by creating a seal between said ring like seal member-fixed to said inner ring and a peripheral surface of said driven side rotatable member, and an enclosed area is formed between between said rubber member and said ball pressing ring by creating a seal between an inner peripheral surface of said rubber member and a peripheral surface of said ball pressing ring.

7. The power transmission of claim 5, wherein an enclosed area is formed between said rubber member and said driven side rotatable member by creating a seal between an inner peripheral surface of said rubber member, and an enclosed area is formed between said driven side rotatable member and a ring-like seal member fixed to said inner ring by creating a seal between a peripheral surface of said driven side rotatable member and said ring-like seal member fixed to said inner ring and a peripheral surface of said ball pressing ring.

8. The power transmission of claim 5, wherein an enclosed area is formed between said rubber member and said driven side rotatable member by creating a seal between an inner peripheral surface of said rubber member and a peripheral surface of said driven side rotatable member, and an enclosed area is formed between said rubber member and said ball pressing ring by creating a seal between said inner peripheral surface of said rubber member and a peripheral surface of said ball pressing ring.

9. The power transmission of claim 8, wherein a gap is formed between said outer ring and said pulley and said enclosed area is maintained even if said outer ring, said rubber member, and said inner ring are moved toward said pulley.

10. The power transmission of claim 8, wherein a gap is formed between said driven side rotatable member and said rotary shaft said enclosed area is maintained even if said driven side rotatable member, said plurality of balls, and said ball pressing ring are moved toward said pulley.

11. The power transmission of claim 1, wherein said spring comprises a belleville spring, where an urging force created by said belleville spring presses against said ball pressing ring, wherein said urging force is adjustable.

12. The power transmission of claim 1, wherein a first seal member provides a seal between an inner peripheral surface of said drive side rotatable member and a peripheral surface of said driven side rotatable member, and a second seal member provides a seal between said inner peripheral surface of said drive side rotatable member and a peripheral surface of said ball pressing ring, thereby forming an enclosed space.

13. The power transmission of claim 12, wherein said enclosed area is filled with a fluid selected from a group consisting of preservatives and lubricants.

14. The power transmission of claim 1, wherein said inclined surface of said ball pressing ring has an upper surface and a lower surface, said upper surface presses against each of said plurality of balls before each of said plurality of balls moves from each of said plurality of tapered radial concave portions to each of said plurality of radial and axial concave portions by each of said pairs of tapered surfaces of each of said plurality of tapered radial concave portions, said lower surface presses against each of said plurality of balls after each of said plurality of balls moves from each of said plurality of tapered radial concave portions to each of said plurality of radial and axial concave portions by each of said pairs of tapered surfaces of each of said plurality of tapered radial concave portions, and an inclined angle of said lower surface is less than an inclined angle of said upper surface.

15. The power transmission of claim 1, wherein a first torque, which is generated when each of said plurality of balls begins to be moved from each of said plurality of tapered radial concave portions to each of said plurality of radial and axial concave portions by each of said pairs of tapered surfaces of each of said plurality of tapered radial concave portions, is substantially equivalent to a second torque, which is generated when each of said plurality of balls no longer presses against each of said one pairs of tapered surfaces of each of said plurality of tapered radial concave portions.

* * * * *